(12) United States Patent
Klinnert et al.

(10) Patent No.: US 6,614,388 B2
(45) Date of Patent: Sep. 2, 2003

(54) SENSOR ARRAY HAVING A PULSE ECHO RADAR

(75) Inventors: Roland Klinnert, Kornthal-Muenchingen (DE); Klaus Voigtlaender, Wangen (DE); Hauke Schmidt, East Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/975,031

(22) Filed: Oct. 10, 2001

(65) Prior Publication Data

US 2002/0067304 A1 Jun. 6, 2002

(30) Foreign Application Priority Data

Oct. 10, 2000 (DE) .......................................... 100 49 906

(51) Int. Cl.[7] ............................................... G01S 13/93
(52) U.S. Cl. ........................ 342/70; 342/108; 342/111; 342/115; 342/135; 342/137; 342/145; 342/195
(58) Field of Search ............................. 342/70, 71, 72, 342/59, 89, 90, 107, 108, 109, 111, 112, 115, 131, 132, 134, 135, 137, 145, 157, 158, 189, 194, 195

(56) References Cited

U.S. PATENT DOCUMENTS

| | | | | |
|---|---|---|---|---|
| 4,668,950 A | * | 5/1987 | Russell, Jr. et al. | 340/825.65 |
| 5,285,209 A | * | 2/1994 | Sharpin et al. | 342/424 |
| 6,420,995 B1 | * | 7/2002 | Richmond et al. | 342/45 |
| 2002/0067304 A1 | * | 6/2002 | Klinnert et al. | 342/118 |

FOREIGN PATENT DOCUMENTS

| | | |
|---|---|---|
| DE | 44 42 189 | 5/1996 |
| DE | 198 02 724 | 7/1999 |

OTHER PUBLICATIONS

"Stochastic–constraints method in nonstationary hot–clutter cancellation. I. Fundamentals and supervised training applications", Abramovich, Y.I.; Spencer, N.K.; Anderson, S.J.; Gorokhov, A.Y.; AE S, IEEE Trans on, vol. 34 Is: 4, Oct98 Pp 1271–1292.*

"Convergence analysis of stochastically–constrained spatial and spatio–temporal adaptive processing for hot–clutter mitigation", Abramovich, Y.I.; Gorokhov, A.Y.; Spencer, N.K.; Information, Decision and Control, 1999. IDC 99. Procs.,Page(s): 61–64.*

"Stochastic constraints in nonstationary hot clutter cancellation", Anderson, S.J.; Abramovich, Y.I.; Fabrizio, G.A.; Acoustics, Speech, and Signal Processing, 1997. ICASSP–97., 1997 IEEE Int'l Conference on , Vol: 5, Apr. 21–24, 1997 Pp: 3753–3756.*

(List continued on next page.)

Primary Examiner—John B. Sotomayor
(74) Attorney, Agent, or Firm—Kenyon & Kenyon

(57) ABSTRACT

A sensor array with a pulse echo radar system with which a carrier signal of a microwave transmitter oscillator is transmitted in the form of pulses with a specified pulse repetition frequency in a transmission window. This radar signal is reflected from a target object and the position of the target object is calculated in a mixer from the times of transmission of the pulse to the arrival of the reflected radiation. An array of several transmitter and receiver units with switches are constructed in which the stochastic pulse sequences of each transmission window in each receiver branch are known and the transmitter and receiver units are linked to one another so that in each of the receiver branches the stochastic pulse sequences of each transmission window are detected separately and thereby the cross echoes may also be analyzed.

8 Claims, 1 Drawing Sheet

OTHER PUBLICATIONS

"False detection of chaotic behaviour in the stochastic compound k–distribution model of radar sea clutter", Unsworth, C.P.; Cowper, M.R.; McLaughlin, S.; Mulgrew, B.;Procs of the Tenth IEEE Workshopon Statistical Signal and Array Proc, 2000, P296–300.*

"Performance analysis of direction finding with large arrays and finite data", Viberg, M.; Ottersten, B.; Nehorai, A., Signal Processing, IEEE Transactions on , vol.: 43 Issue: 2, Feb. 1995, Page(s): 469–477.*

A. Ludloff, "Handbuch Radar und Radarsignalverarbeitung" (Handbook of Radar And Radar Signal Processing), pp. 2–21–2–44, Vieweg Verlag, 1993.

* cited by examiner

SENSOR ARRAY HAVING A PULSE ECHO RADAR

FIELD OF THE INVENTION

The present invention relates to a sensor array having a pulse echo radar.

BACKGROUND INFORMATION

German Published Patent Application No. 44 42 189 discusses that sensors having transmitting and receiving units for both sending and receiving data may be used in a system for measuring distance in the area surrounding motor vehicles. With the aid of the distance measurement, passive measures to protect the vehicle may be activated, for example, in the event of a head-on, side, or rear-end collision. With an exchange of the data that is acquired, an evaluation of the traffic situation may be performed, for example, for the activation of appropriate deployment systems.

Additionally, it is believed that distance may be measured using a pulse radar in which a carrier pulse having a rectangular envelope of an electromagnetic oscillation is transmitted in the gigahertz range. This carrier pulse is reflected from the target object and the target distance and, with limitations, using the Doppler effect, also the relative speed of the target object may be determined from the time of transmission of the pulse to the time of arrival of the reflected radiation. Such a measurement principle is described in A. Ludloff's technical book, "Handbuch Radar und Radarsignalverarbeitung" [Handbook of Radar and Radar Signal Processing], pages 2–21 to 2–44, Vieweg Verlag, 1993.

A plurality of radar sensors for the individual conflict situations in the area surrounding the motor vehicle may be required for the reliable deployment of the passenger protection system in a motor vehicle that was mentioned at the outset. For example, early collision recognition (precrash recognition) may be required to permit timely detection of an object that constitutes a danger for the vehicle's passengers in a collision.

In this regard, the prior radar sensors for pulse echo operations may transmit the pulses with a fixed repetition frequency, so that the pulse trains from different transmitters thus may not be distinguished. When the transmitters of a microwave radar system operate independently from one another, e.g., with a pulse repetition frequency of 6 MHz, a carrier frequency of 24 GHz, and a pulse width of approx. 350 ps, each sensor receives only object echoes of its own pulses, while the echoes of pulses from the other transmitters are either not received or received only in the form of signal noise.

German Published Patent Application No. 198 02 724 discusses a monitoring device in which coded ultrasound pulses are transmitted that may be detected with appropriate signal echo sensors. In this regard, for the sake of differentiating the pulses that are received, they may be coded previously via a random generator and then selectively analyzed accordingly.

SUMMARY OF THE INVENTION

The present invention may provide a sensor array having a pulse echo radar system in which a carrier signal of a microwave transmitter may be transmitted in the form of pulses with a specified pulse repetition frequency. This microwave signal may be reflected from a target object and the position of the target object may be calculated in a mixer circuit from the time of transmission of the pulse and the arrival of the reflected radiation. In the process, the pulses may be transmitted only with a predefined probability via a random switch so that the stochastic pulse sequences of the transmitter may be known at the receiver for analyzing the signals that are received. Through this coding the differentiation of several transmitted signals may also be provided. This and other features of the exemplary embodiments of the invention are presented in the following description and the drawings, with each of the individual features capable of being implemented by itself or severally in the form of subcombinations in the exemplary embodiment of the invention also in different fields and may represent exemplary embodiments that are desired and for which protection is claimed here.

DETAILED DESCRIPTION

According to an exemplary embodiment of the present invention, an array may be constructed from several transmitter and receiver assemblies which are present in any number $n \geq 1$, in which the stochastic pulse sequences of each transmitter are known at each receiver and the transmitter and receiver units are linked with one another so that the stochastic pulse sequences of each transmitter may be analyzed separately at each receiver. With the circuit arrangement that was previously mentioned, the transmission window may be enabled as a function of the stochastic pulse train of the respective transmitter, and a receiver window may be opened at each receiver for all pulses that are transmitted. A correlation of the signals pertaining to each transmitter with the respective signals that are received may be performed after the signals that have been received are mixed with the carrier signal in each of the respective mixer circuits of the transmitter and receiver units.

With the stochastic coding of the transmission pulse trains according to an exemplary embodiment of the present invention, the transmitter and transmission time may be reconstructed from a pulse train that is received using an array of several transmitter and receiver units and thus may increase the immunity from interference by other transmitters, since the coding may affect the detection along with the reception interference power. Thus a cross-echo analysis of the whole array for determining the location of the target object may be provided.

Furthermore, late echoes may be discriminated, i.e., of echoes of objects that lie outside the area of unambiguity (for example, 15 m when used in the automobile industry). This may also apply to apparent objects, which appear to lie outside the area of detection due to multiple reflections. An even higher signal-to-noise ratio may be achieved if the pulse repetition frequency is increased, in which case the inter-pulse period may even fall below the light transit time over the detection area.

In an exemplary embodiment, each of the transmitter and receiver units has a FIFO register controlled by the switch in the transmission branch of the respective transmitter and receiver unit with which each received signal may be switched to a separate accumulator for correlation of the signals pertaining to each transmitter with the respective signals received with a delay.

Figure 1:
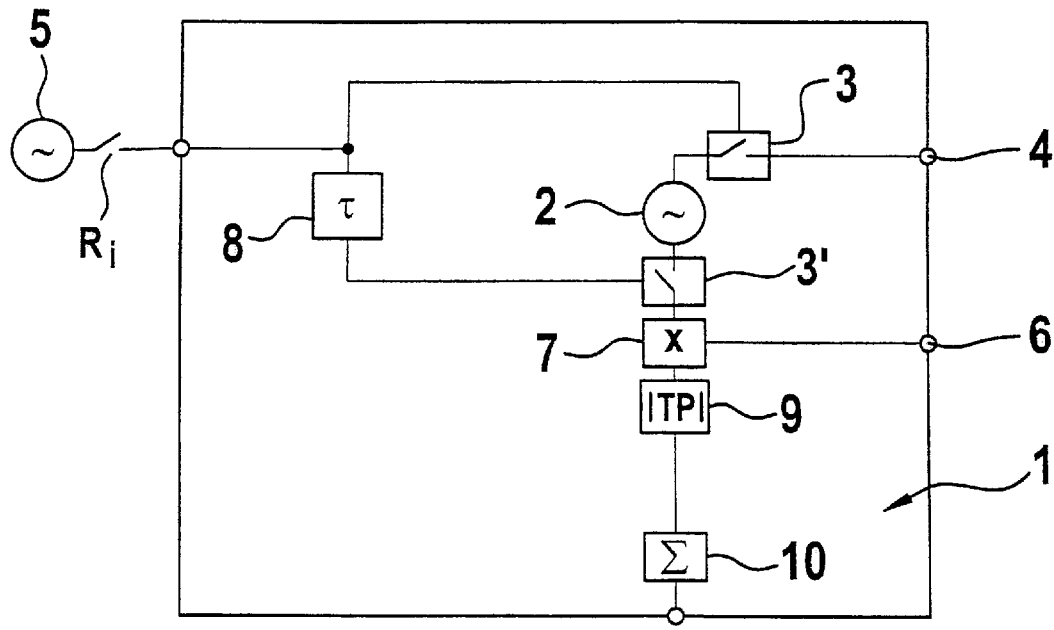
FIG. 1 shows a schematic block diagram of a transmitter and receiver unit of a stochastically coded microwave radar system using a pulse echo process.

In FIG. 1 a schematic block diagram of a transmitter and receiver unit 1 of a microwave radar system is depicted, which has a transmitter oscillator 2 for the carrier signal, e.g., with a frequency of 24 GHz, the first output of transmitter oscillator 2 being switched via a switch 3 so that there is a pulsed output signal at output 4 of unit 1. Switch 3 is controlled by a pulse generator 5, which may have a pulse frequency of 50 MHz, for example. The timing signal of pulse generator 5 is sent here via an additional switch $R_i$ through which the transmission pulse sequence is stochastically coded.

In this process switch $R_i$ may ensure that not every pulse from pulse generator 5 is transmitted but rather that a pulse is only sent with a probability P prescribed by switch $R_i$. The received signal reflected from a target object arrives at a receiver input 6 of unit 1 and is sent to a mixer 7. The carrier signal of transmitter oscillator 2, which is pulsed in the same manner via a switch 3' with the coded timing signal of pulse generator 5, albeit delayed by a time factor $\tau$ (0 to $2\pi$), is also sent to this mixer 7.

A distance window of the sensor array is defined with the delay in unit 8, since the signal that is transmitted, reflected from the target object, and received at input 6 also has a transit time that is determined by the distance of the target object. The signal that depends on the distance and is obtained through the mixing is sent to an accumulator 10 after filtering and absolute-value generation in a low pass filter 8. For the pulse echoes reflected from the target object only a fraction of the energy in accumulator 10 that would have been received without coding is detected because of the coding if the correct pulse delay has been selected. This effect may be compensated for through a simple increase in the pulse repetition frequency from, e. g. the usual 6 MHz to 18 MHz or higher.

Figure 2:
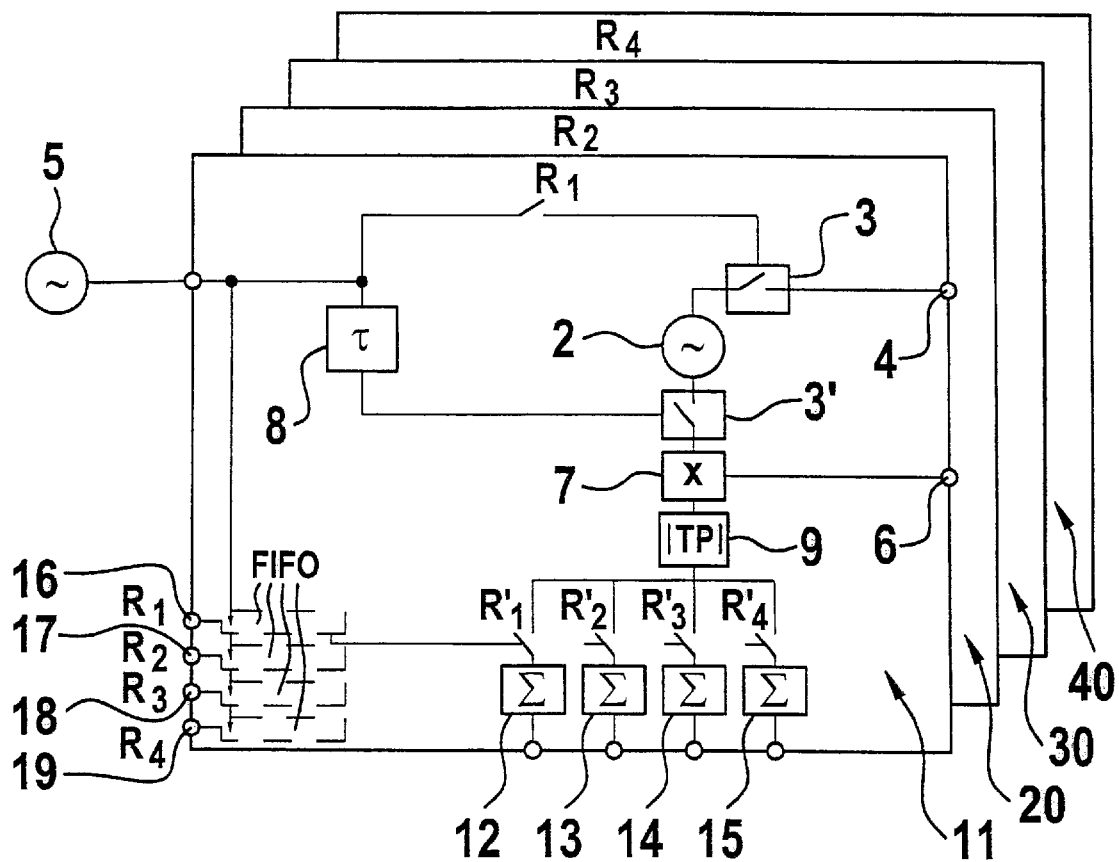
FIG. 2 shows a schematic block diagram of an array of transmitter and receiver units of a microwave radar system according to FIG. 1.

FIG. 2 shows the configuration of an array of transceiver units 11, 20, 30, and 40, which differs from the configuration of transceiver unit 1 according to FIG. 1 through the position and number of additional switches $R_1$ to $R_4$ or $R'_1$ to $R'_4$. Components having the same function are marked with the same reference numbers as in FIG. 1.

When several transceiver units 11, 20, 30, and 40 according to FIG. 2 are used, cross-echo analysis may be provided with the aid of stochastic coding using switches $R_1$ to $R_4$, corresponding to switch $R_1$ under FIG. 1, if the stochastic pulse sequences of the transmission signal at each output 4 are known to the respective receiver branch at input 6. In the exemplary embodiment according to FIG. 2 the pulse actuation for each transmission window via switch 3 is enabled or disabled directly through switch $R_1$ for unit 11 to switch $R_4$ for unit 40, depending on the stochastic pulse sequence of the transmission signal of the respective units 11 to 40.

Pulses from all transmitting windows should be received in the receiver branch of the respective units 11 to 40. Hence the receiving window in each unit 11 to 40 may be required to be opened upstream from mixer 7 and low-pass filter 9 with each of the pulses that is transmitted. The correlation of each stochastic transmission sequence of one of the units thus occurs only downstream from mixer 7. Here the signal received at each input 6, after filtering and absolute-value generation in low-pass filter 9, is switched or not switched to the respective accumulators $A_i$ (here 12 to 15 in unit 11) in the inter-pulse period involved, as a function of the random values 0 or 1 of switch $R_i$ ($R_1$ to $R_4$) of the respective transmitter branch of unit 1 (11 to 40).

For this purpose, the switch states of switches $R_1$ to $R_4$ are sent to each of units 11 to 40 via appropriate inputs to FIFO buffers 16 to 19 with which the switch states are delayed by a number of periods of pulse generator 5 that may be set in each case through which various distance ranges may be analyzed. The output voltage at each accumulator $A_i$ differs depending on whether the switch pulse sequence was correlated with the reception pulse sequence or not. For n transmitters one thus obtains $n^2$ accumulators $A_{ij}$ (i,j=1 . . . n corresponding to the accumulator for transmitter j in receiver branch i). In this process accumulators $A_{ii}$ receive the echoes of their own pulses and accumulators $A_{i,j \neq i}$ receive the cross echoes.

Since the propagation of the radar waves is reciprocal, $E(A_{ij})=E(A_{ji})$ applies to the expected values, i.e., each two cross-echo accumulators $A_{ij},A_{ji}$ contains the same signal portion; only their noise portions differ. This circumstance may be used in a subsequent refinement for averaging the two accumulator units to reduce the noise further or to reduce the computing and hardware expenditure, since only one accumulator is implemented and analyzed.

What is claimed is:

1. A sensor array for a pulse echo radar system, comprising:

a microwave transmitter oscillator to transmit a carrier signal in a form of pulses with a specified pulse repetition frequency in a transmission window, the pulses being reflected from a target object;

a receiver branch having a mixer to estimate a position of the target object from a time of transmission of a pulse to a time of arrival of reflected radiation; and at least two random switches to transmit pulses with a predefined probability so that stochastic pulse sequences of the transmission window are known in the receiver branch.

2. A sensor array for a pulse echo radar system, comprising:

a microwave transmitter oscillator to transmit a carrier signal in a form of pulses with a specified pulse repetition frequency in a transmission window, the pulses being reflected from a target object;

a receiver branch having a mixer to estimate a position of the target object from a time of transmission of a pulse to a time of arrival of reflected radiation;

a random switch to transmit the pulses with a predefined probability so that stochastic pulse sequences of the transmission window are known in the receiver branch; and a plurality of transmitter and receiver units having switches in which the stochastic pulse sequences of each transmission window in each receiver branch are known and the transmitter and receiver units are linked with one another so that the stochastic pulse sequences of each transmission window are analyzed separately in each of the receiver branches.

3. The sensor array according to claim 2, wherein a respective transmission window is enabled via switches as a function of the stochastic pulse train of the respective transmission signal and a receiving window for all pulses that have been transmitted is opened in each receiver branch via further switches, and a correlation of each of the pulses associated with a transmission window with each of the respective pulses received is carried out after a mixing of the signals received with the carrier signal in each of the respective mixers of the transmitter and receiver units.

4. The sensor array according to claim 3, further comprising:

a pulse generator; and a FIFO buffer in each of the transmitter and receiver units controlled by the switches in the transmitter branch of each transmitter and receiver unit with which a respective switching signal for each of the switches is delayed by a number of periods of the pulse generator that is settable in each case.

5. The sensor array of claim 4, further comprising:

a plurality of accumulators to correlate each of the pulses associated with a transmission window.

6. The sensor array of claim 5, wherein late echos of objects outside an area of unambiguity are discriminated.

7. The sensor array of claim 6, wherein the area of unambiguity is within 15 meters of a vehicle.

8. The sensor array of claim 5, wherein values of the accumulators are averaged to reduce one of noise and an expenditure of computing hardware.

* * * * *